July 24, 1923.

E. G. K. ANDERSON 1,462,473

AUTOMATIC SWITCH CONTROL FOR SPOTLAMPS

Filed June 27, 1921

Inventor:
Ernst G. K. Anderson

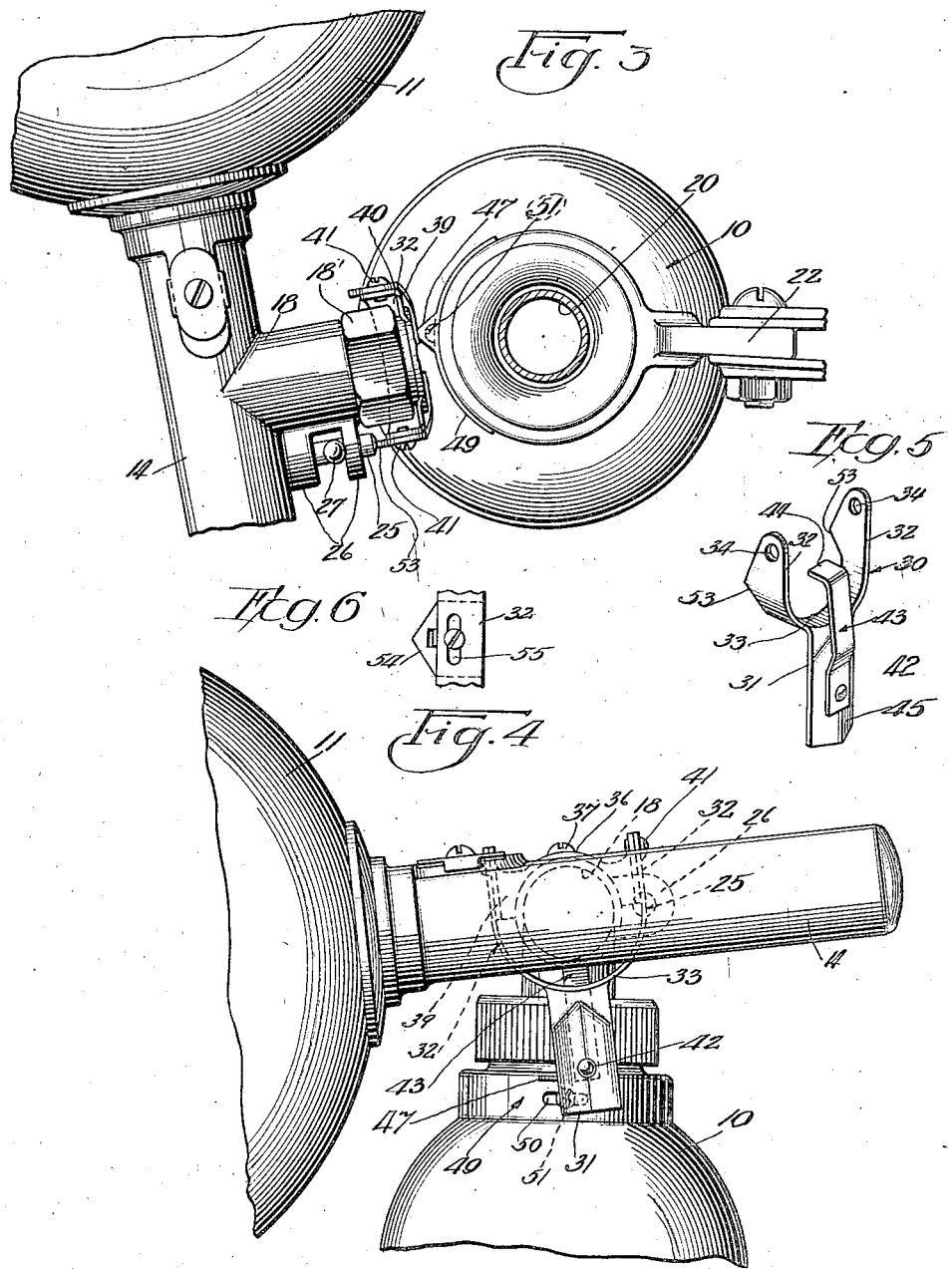

Patented July 24, 1923.

1,462,473

UNITED STATES PATENT OFFICE.

ERNST G. K. ANDERSON, OF CHICAGO, ILLINOIS, ASSIGNOR, BY MESNE ASSIGNMENTS, TO APPLETON ELECTRIC CO., OF CHICAGO, ILLINOIS, A CORPORATION OF ILLINOIS.

AUTOMATIC SWITCH CONTROL FOR SPOTLAMPS.

Application filed June 27, 1921. Serial No. 480,562.

*To all whom it may concern:*

Be it known that I, ERNST G. K. ANDERSON, a citizen of the United States, and a resident of Chicago, in the county of Cook and State of Illinois, have invented certain new and useful Improvements in Automatic Switch Controls for Spotlamps; and I do hereby declare that the following is a full, clear, and exact description thereof, reference being had to the accompanying drawings, and to the characters of reference marked thereon, which form a part of this specification.

This invention relates to improvements in switch controls for signal or spot lamps of that type designed for use on automobiles and other vehicles and adapted to be supported by universal mountings adapted to project the rays of the lamp in substantially universal directions.

As shown in the drawings:

Figure 3 is a plan view with parts broken away and other parts in section, showing the lamp in a horizontal position of adjustment.

Figure 4 is a side view thereof, showing the lamp adjusted vertically.

Figure 5 is a perspective detail illustrating the switch control element.

Figure 6 is a detail of the control element actuator hereinafter to be described.

Figure 1:
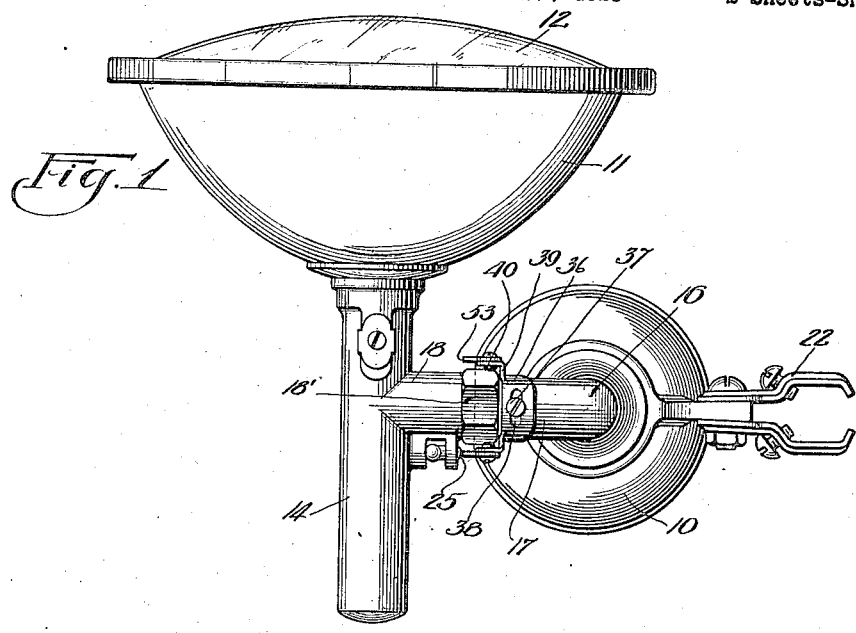
Figure 1 is a plan view of a lamp and mounting therefor equipped with a control mechanism embodying my invention.

In said drawings, my improvements are adapted to a type of lamp and mounting which embodies in its construction a rewinding reel structure for taking up the lamp cord, whereby the cord can be unwound from the reel when the lamp is detached from its support and used as a trouble lamp, or for other similar purposes, the cord being automatically rewound on the reel when the lamp again approaches and is replaced at its normal station on the vehicle. In such a construction the rewinding reel is enclosed by a casing 10.

11 designates the casing of the spot lamp; 12 the front lens, and 14 designates a stem which extends rearwardly from the casing, coaxial with the focal axis of the reflector within the casing. The stem 14 is made hollow to receive the lamp controlling switch, such, for instance, as is shown in my application for United States Letters Patent, Serial Number 480,347, filed June 25th, 1921. It will be understood, however, that the switch control constituting the present invention is capable of use with other types of switches and other types of universal lamp mountings.

The universal mounting shown embraces as an element thereof an elbow fitting 16, one arm 17 of which is rotatively connected to a hollow stud 18, which can be formed integral with the stem 14, of a joint connection like that shown in my aforesaid application; the rotational connection between the arm 17 and the stud 18 permitting the lamp casing to be swung or adjusted in a vertical plane. The other arm 20 of said elbow fitting is rotatively connected with the ring portion 21 of a bracket member 22 by which the lamp structure is fixed to a suitable support, said ring also sustaining the reel casing 10. The joint connection between said arm 20 and ring portion 21 is of a nature to permit the elbow fitting, and thereby the lamp casing, to be swung in a horizontal plane.

25 designates as a whole a switch actuator which is supported for rotational and axial movement in lugs or ears 26 formed integral with the stem 14 and the stud 18. Said actuator is provided with a hand piece 27 by which the switch within the stem may be manually controlled. The said switch is adapted to be automatically controlled by the means hereinafter described through endwise or axial movement of the actuator 25.

Referring now to the structural details of a preferred embodiment of the type of switch control constituting the present invention, the same are made as follows:

30 designates, as a whole, a control element (Figure 5). Said control element is a swinging element and it comprises a central depending shank portion 31 and two arms 32, giving to the control element the general formation of a fork. The arms 32 are connected to the shank portion 31 through the medium of an intermediate curved member 33, so that the said control element can be fitted upwardly from beneath the arm 17 of the elbow fitting 16 in the manner best shown in Figure 4. The upper ends of said arms 32 are provided with perforations 34.

36 designates a saddle which is curved to conform to the upper side of the arm 17 of the elbow fitting, and is adapted to be fixed to said arm by a screw 37. Said screw extends through a slot 38 in the saddle that is disposed transversely to the axis of the arm 17. The slot enables the saddle to be adjusted angularly about the axis of the arm 17 in a vertical plane. Said saddle piece is provided at its front margin and at its ends with oppositely extending arms 39 that are formed with forwardly extending terminals 40 which are apertured to register with the apertures 34 of the arms of the control element. Thereby is provided means for hingedly supporting the control element on the terminals 40 of the saddle arms by screws 41 which extend through the registering apertures of the said parts and are threaded into the terminals 40, as herein shown. Said hinge connection permits the control element to swing towards and from the reel casing supporting bracket for a purpose hereinafter to be described.

Fixed to the shank 31 of said fork shaped control element, as by a rivet 42, is a leaf spring 43 that lies along the upper portion of the shank and extends at its upper end behind the curved connecting portion 33 of the control element. Said spring is provided on its upper end with a forwardly extending terminal 44 that is adapted for contact with the rear side of a nut 18' that constitutes a portion of the rotational joint between the arm 17 of the elbow shaped fitting 16 and the stem stud 18. The effect of this spring, is to tend to throw the shank portion of said swinging control element rearwardly towards the bracket ring 21. The shank portion of said control element is preferably formed with a shallow V-shaped cross section, with its central ridge portion 45 directed rearwardly or toward said ring member 21.

Said ring member 21 of the bracket carries a forwardly projecting lug or projection 47 which is directed towards the shank portion of the said control element and is adapted to wipingly engage the angular portion of the shank when the control element is swung therepast. Thus, when the lamp mounting is swung about the axis of the arm 20 of the elbow fitting, the projection engages said shank portion when the lamp is in a given position, as the mid position of the throw, and forces the control element forwardly about the axes of the hinge screws 41. Preferably, and as herein shown, the said control projection 47 is mounted to be angularly adjustable with respect to the axis of the arm 20 of the elbow fitting. Conveniently this may be effected by forming said control projection on a narrow curved bar 49 that is shaped to fit flat against and partially embrace the ring member 21 of the bracket. Said curved bar is provided with a slot 50, through which extends a screw 51 that locks it in place on the ring member 21. With this construction, by slacking the screw slightly, the projection carrying bar 49 can be adjusted angularly with respect to the swinging axis of the arm 20 and thereafter locked in fixed adjusted position relatively to the ring member. Said adjustment is desirable to adapt the lamp and its mounting to supports, regardless of lack of proper alignment, so that the control can be made to operate in any desired position of the lamp sweep within a reasonable range.

The arms 32 of the control element are provided at their forward edges with forwardly directed projections 53, one of which in each installation of a lamp and its mounting is adapted for contact with the adjacent rounded end of the actuator switch pin 25 when the lamp casing and its stem are swung on the axis of the joint, embracing as a part thereof the stud 18. Two of said projections, one on each arm 32, is provided to adapt the control member to right and left hand installation. If desired, the projections on said arms 32 may be vertically adjustable. Such a detail is shown in Figure 6, wherein a projection piece 54 is attached to a recessed portion of the arm 32 by means of a screw that extends through a slot 55 of said projection piece and is threaded into the recessed portion of said arm.

In operation, when the lamp structure is swung to project the light rays from the lamp straight ahead, either about its horizontal or vertical axis sweep, the engagement of the control element shank 31 with the projection 47 will cause the said control element to be swung forwardly about the axis of the hinge screws 41. If at this time the lamp casing is in its horizontal straight ahead position, the swinging of the control element forwardly will act through the projections 53 or 54 against the switch actuator pin 25 to force said pin inwardly and open the switch, depending upon the construction of the switch and its actuator.

It is apparent that the control may be actuated to extinguish the light either when the lamp structure is moving through its horizontal or vertical sweep, and when wiping contact of the stem 31 with the projection 47 and wiping contact of the projection (53, 54) with the rounded end of the actuator pin 25 coincides. If the control projection be out of line with the stem 31, the spring 43 will act to swing the control element to throw the projection (53, 54) rearwardly away from the axially movable actuator pin. Likewise contact of the projection 47 with the control element shank will not actuate the actuator pin if the vertical adjustment of the lamp is such as to shift the pin 25 out of line with the projection (53, 54).

Figure 2:
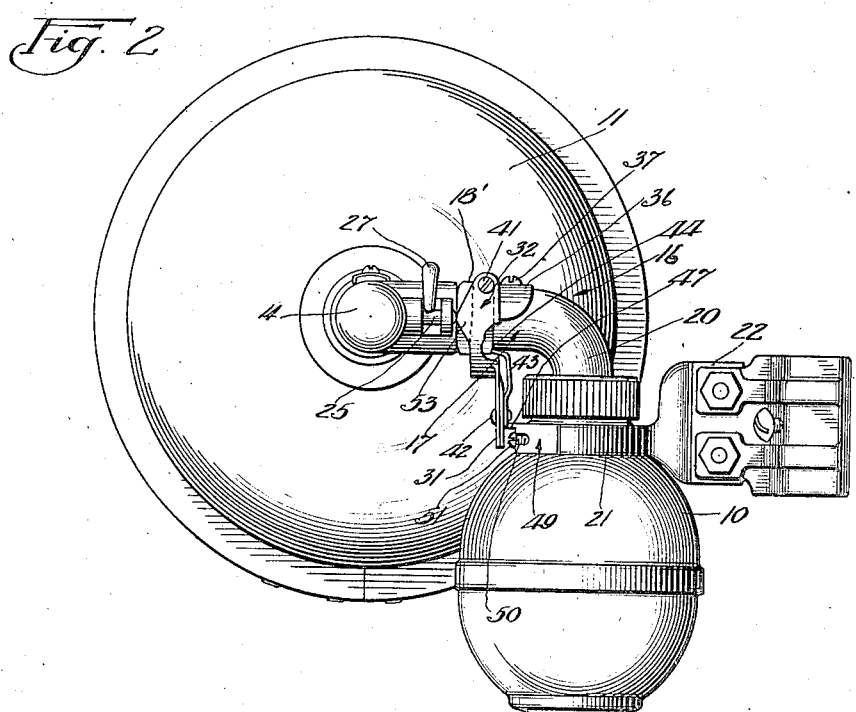
Figure 2 is a rear elevation thereof.

Thus, it will be observed that when the lamp casing is in position to project the rays of the light straight ahead, the switch actuator will be actuated to open the lamp controlling switch and thereby extinguish the light. It becomes impossible, therefore, for the driver of a motor vehicle, equipped with a switch control embodying this invention, to throw or project the light rays directly ahead into the eyes of an oncoming driver or pedestrians on the street. In order to regain control of the light, after the lamp circuit has been opened, it is necessary for the driver to shift the lamp casing horizontally to the right or left or vertically. If the lamp casing be shifted vertically either upwardly or downwardly from the position shown in Figures 1 and 2, to that shown in Figure 4, the switch actuator pin 25 will be moved out of the influence of the projection 53, so that the switch, which is a self closing switch, will be operated to close the lamp circuit. Likewise if the lamp casing be swung horizontally, from the position shown in Figures 1 and 2 to that shown in Figure 3, it will carry the shank or stem 31 of the control element to one side or the other of the control projection 47 so as to thereby permit the lower end of said control element to swing rearwardly and to cause the projection 53 to swing away from the switch actuator pin and allow the lamp circuit to be closed. The spring 43 serves, when the shank 31 is out of line, with the projection 47 to restore the control member rearwardly on its hinge screws 41 and to thereby move said projections (53, 54) out of the influence with the switch actuator pin 25 and thereby allow the lamp circuit to be closed. When the structure is adjusted to either of the positions shown in Figures 3 and 4 or in any other position than a straight ahead adjustment, full and free range of adjustment of the lamp is afforded for the necessary and normal uses of a spot light.

It will be noted that the adjustment of the saddle 36, afforded by reason of the slot 38 therein, through which the fastening screw 37 extends, and the adjustment of the projection bar 49 afforded by the slot therein through which its fastening screw 51 extends, permits the control mechanism to be accurately adjusted in position to close the lamp circuit in a straight ahead position, regardless of slight differences in the angle of the support to which the mounting is adapted to be attached by the bracket 22. The construction shown in Figure 6, however, permits adjustment to be separately effected for both motions of sweep of the lamp.

I claim:

1. Automatic control for universal electric spot lamps comprising, in combination with the members of a universal mounting for the lamp casing and a lamp controlling switch having an actuator member, of a control element swingingly supported on said mounting and cooperating with said actuator and a part fixed on the mounting and operative to control said switch in a given position of the lamp when moving through any direction of its universal sweep.

2. Automatic control for universal electric spot lamps comprising, in combination with the members of a universal mounting for the lamp casing and a lamp controlling switch having an actuator member, of a control element swingingly supported on one of the mounting members and provided with a contact portion adapted to cooperate with said actuator, and another portion adapted to cooperate with a part fixed relatively to the mounting members.

3. Automatic control for universal electric spot lamps comprising, in combination with the members of a universal mounting for the lamp casing and a lamp controlling switch having an actuator member, of a control element hinged to one of said mounting members and adapted for wiping contact with said actuator member and provided with a part adapted for wiping contact with a relatively fixed projection.

4. Automatic control for universal electric spot lamps comprising, in combination with the members of a universal mounting for the lamp casing and a lamp controlling switch provided with an axially movable actuator, of a control element swingingly supported on one of the mounting members and having a part adapted for wiping engagement with the end of said axially movable actuator and another part adapted for wiping engagement with a part fixed relatively to said mounting.

5. Automatic control for universal electric spot lamps comprising, in combination with the members of a universal mounting for the lamp casing and a lamp controlling switch provided with an axially movable actuator, of a control element swingingly supported on one of the mounting members and having a part adapted for wiping engagement with the end of said axially movable actuator and another part adapted for wiping engagement with a part fixed relatively to said mounting, and means acting on the control element to normally hold it in retracted position.

6. Automatic control for universal electric spot lamps comprising, in combination with the members of a universal mounting for the lamp casing and a lamp controlling switch, of a control element swingingly supported on one of the mounting members and having a part adapted to cooperate with said switch, and another part adapted for wiping engagement with a part fixed relatively to said mounting, and a control element restoring spring fixed to the control element and bearing against a shoulder on one of the mounting members.

7. Automatic control for universal electric spot lamps comprising, in combination with the members of a universal mounting for the lamp casing, a lamp controlling switch, and a saddle member fixed on one of said mounting members, with means for angularly adjusting it thereon, of a control element swingingly supported on the saddle member to cooperate with said switch and adapted for wiping engagement with a projection fixed relatively to said mounting members.

8. Automatic control for universal electric spot lamps comprising, in combination with the members of a universal mounting for the lamp casing and a lamp controlling switch, of a control element swingingly supported on one of said mounting members for cooperation with said switch, a control projection fixed relatively to said mounting members, with which said control element has wiping engagement, and means for angularly adjusting said control projection.

9. Automatic switch control for universal spot lamps comprising, in combination with a bracket having means of attachment to a fixed support, an elbow fitting having one arm rotatively supported in said bracket, a lamp structure and its lamp controlling switch, and a rotative connection between said lamp structure and the other arm of said elbow fitting, of a switch control element having means to hinge it to said latter arm of the elbow fitting and adapted to cooperate with said switch to control it, said control element being adapted for wiping contact with a fixed projection on said bracket.

10. Automatic switch control for universal spot lamps, comprising in combination with a bracket having means of attachment to a fixed support, members of a universal mounting, one of which is rotatively supported in said bracket, and on the other of which the lamp structure is rotatively mounted, and a lamp controlling switch, of a switch control element having means to hinge it to one member of said universal mounting and adapted to cooperate with said switch, and a projection on said bracket adapted for wiping contact with a part of said control element, and means for angularly adjusting said projection relatively to said bracket.

11. Automatic switch control for universal spot lamps comprising, in combination with a lamp casing, a stem extending rearwardly therefrom, and a switch carried by said stem and provided with a laterally directed actuator, of a bracket having means of attachment to a support, universal mounting members, one rotatively supported on said bracket and another connected to said stem, an intermediate member swingable on said bracket on one turning axis, and, in turn, rotationally supporting said stem to swing on another axis, and a swinging switch control element operative through swinging movement of said members, with means to separately adjust the controlling functions of said control element.

12. The combination with a lamp casing, a lamp switch actuator, a bracket ring having means of attachment to a support, a rewinding reel casing fixed to said ring, an elbow fitting, the vertical arm of which is rotative in the axis of said bracket ring, and a rotational connection between the other arm of said elbow fitting and the lamp structure, of a control element swingingly mounted on the one arm of said fitting, and having a part adapted for cooperation with said switch actuator, and provided also with a part adapted for wiping contact with a projection on said ring.

13. The combination with a lamp casing, a lamp switch actuator, a bracket ring having means of attachment to a support, a rewinding reel casing fixed to said ring, an elbow fitting, one vertical arm of which is rotative in the axis of said bracket ring, and a rotational connection between the other arm of said elbow fitting and the lamp structure, of a control element swingingly mounted on one arm of said fitting, and having a part adapted for cooperation with said switch, and provided also with a part adapted for wiping contact with a projection on said ring, means for angularly adjusting the swinging axis of said control member, and other means for angularly adjusting said projection relatively to the axis of said bracket ring.

In witness whereof I claim the foregoing as my invention, I hereunto append my signature this 13 day of June 1921.

ERNST G. K. ANDERSON.